(12) United States Patent
Tsukamoto et al.

(10) Patent No.: US 8,341,844 B2
(45) Date of Patent: Jan. 1, 2013

(54) MANUFACTURING METHOD OF AN OUTER RING FOR A BEARING UNIT

(75) Inventors: Shigemi Tsukamoto, Fujisawa (JP); Katsuyuki Kawamura, Fujisawa (JP); Hirohide Ishida, Fujisawa (JP); Tatsuo Wakabayashi, Fujisawa (JP)

(73) Assignee: NSK Ltd., Tokyo (JP)

( * ) Notice: Subject to any disclaimer, the term of this patent is extended or adjusted under 35 U.S.C. 154(b) by 696 days.

(21) Appl. No.: 12/298,308

(22) PCT Filed: Apr. 24, 2007

(86) PCT No.: PCT/JP2007/058877
§ 371 (c)(1),
(2), (4) Date: Oct. 24, 2008

(87) PCT Pub. No.: WO2007/125927
PCT Pub. Date: Nov. 8, 2007

(65) Prior Publication Data
US 2009/0199404 A1    Aug. 13, 2009

(30) Foreign Application Priority Data

Apr. 25, 2006 (JP) ................. 2006-120608
Mar. 30, 2007 (JP) ................. 2007-091589

(51) Int. Cl.
*B21D 53/10* (2006.01)
(52) U.S. Cl. ............................. 29/898.066
(58) Field of Classification Search ........... 29/898.066
See application file for complete search history.

(56) References Cited

U.S. PATENT DOCUMENTS

| 2003/0215169 A1* | 11/2003 | Yajima ................. 384/516 |
| 2005/0111771 A1 | 5/2005 | Shevket |

FOREIGN PATENT DOCUMENTS

| DE | 1 125 805 B | 3/1962 |
| DE | 1 752 633 A1 | 10/1971 |
| DE | 32 06 739 C2 | 10/1982 |
| GB | 1 395 209 A | 5/1975 |
| JP | 59-226118 A | 12/1984 |
| JP | 2001-158917 A | 6/2001 |
| JP | 2004-019823 A | 1/2004 |
| JP | 2004-092830 A | 3/2004 |
| JP | 2004-108449 A | 4/2004 |

(Continued)

OTHER PUBLICATIONS

Extended European Search Report dated Sep. 29, 2009.

(Continued)

*Primary Examiner* — David Bryant
*Assistant Examiner* — Moshe Wilensky
(74) *Attorney, Agent, or Firm* — Sughrue Mion, PLLC (57) ABSTRACT

With respect to an outer ring 2*b* in which a diameter $D_{B1}$ of a first outer ring raceway 10*c* is greater than a diameter $D_{B2}$ of a second outer ring raceway 10*b* ($D_{B1} > D_{B2}$), a method is realized which facilitates the entry of a grinding tool 12 into an inner side of the outer ring when these both outer ring raceways 10*c* and 10*b* are subjected to a grinding process.
The grinding tool 12 is made to enter the inner side of the outer ring 2*b* through an opening on a side close to the first outer ring raceway 10*c*.

4 Claims, 6 Drawing Sheets

FOREIGN PATENT DOCUMENTS

| | | |
|---|---|---|
| JP | 2004-167610 A | 6/2004 |
| JP | 2004261904 A | 9/2004 |
| JP | 2005147372 A | 6/2005 |
| JP | 2006-95629 A | 4/2006 |
| JP | 2006-104558 A | 4/2006 |

OTHER PUBLICATIONS

Communication Pursuant to Rule 114(2) EPC dated Aug. 27, 2009.

Japan Office Action issued on May 1, 2012 in corresponding Application No. JP 2007-091589.

* cited by examiner

MANUFACTURING METHOD OF AN OUTER RING FOR A BEARING UNIT

TECHNICAL FIELD

A manufacturing method of an outer ring for a bearing unit of the invention is used for manufacturing outer rings which make up various types of bearing units, such as a wheel-supporting bearing unit which is used for rotatably supporting an automotive wheel to a suspension device.

BACKGROUND ART

Figure 4:
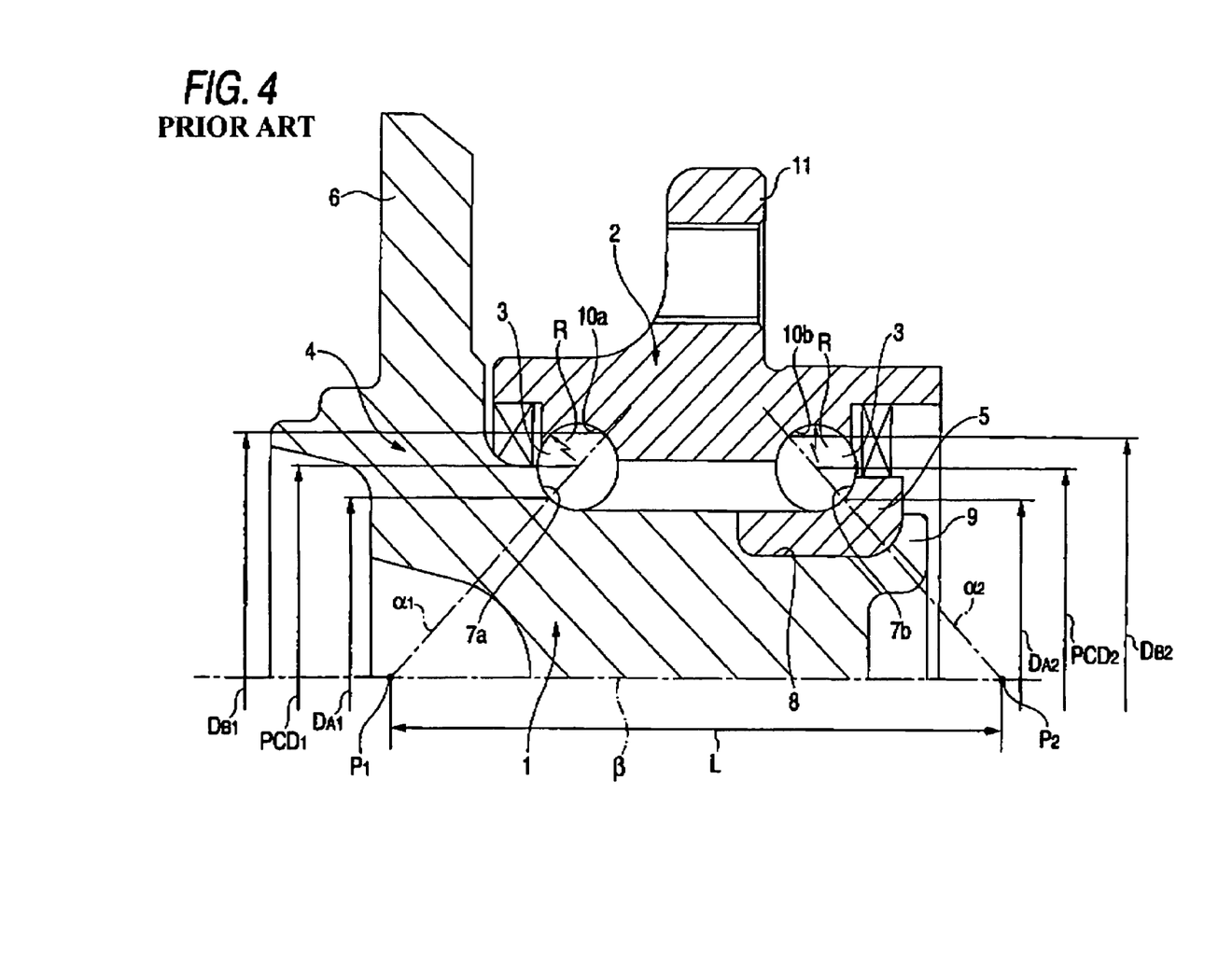
FIG. 4 is a half cross-sectional view illustrating an example of a wheel-supporting bearing unit in which diameters of both first and second outer ring raceways are equal.

A wheel of an automobile and a rotating member in a brake system are rotatably supported to a suspension device via a wheel-supporting bearing unit. FIG. 4 shows an example of a conventionally known wheel-supporting bearing unit. This wheel-supporting bearing unit includes a hub 1, an outer ring 2, and a plurality of balls 3 which are rolling elements. The hub 1 is formed by combining together a hub body 4 and an inner ring 5.
The hub body 4 has a mounting flange 6 disposed on a portion near to an outer end of an outer peripheral surface of the hub body 4 and adapted to support the automotive wheel and the rotating member for brake system; a first inner ring raceway 7a disposed on an intermediate portion of the hub body 4; and a small-diameter stepped portion 8 disposed on an inner end portion of the hub body 4 and having a smaller outside diameter dimension than this first inner ring raceway 7a. (Here, the outer side with respect to the axial direction refers to the widthwise outer side of an automobile when the wheel-supporting bearing unit is incorporated into the automobile, i.e., the left side in FIGS. 4 to 6. Conversely, the right side in FIGS. 4 to 6, which is the widthwise central side of the automobile, is referred to as the inner side with respect to the axial direction. This is true throughout the specification.) The inner ring 5 is fitted over this small-diameter stepped portion 8, and the inner ring 5 is fixed to the hub body 4 by a caulked portion 9 formed by plastically deforming an inner end portion of the hub body 4 in a radially outward direction. A second inner ring raceway 7b is formed in an outer peripheral surface of this inner ring 5.

The outer ring 2 has formed in its inner peripheral surface a first outer ring raceway 10a opposing to the first inner ring raceway 7a and a second outer ring raceway 10b opposing to the second inner ring raceway 7b, and has a coupling flange 11 formed on its outer peripheral surface for coupling and fixing to the suspension device. The plurality of balls 3 are rotatably provided between each of the both first and second inner ring raceways 7a and 7b and each of the both first and second outer ring raceways 10a and 10b while retaining by an unillustrated retainer. By this configuration, a double-row angular contact ball bearing in a back-to-back combination is formed to support the hub 1 on the inner side of the outer ring 2 rotatably and in such a manner as to be capable of bearing the radial load and the thrust load. It should be noted that although in the illustrated example, the balls 3 are used as rolling elements, tapered rollers can be used when a bearing unit is used for an automobile having heavy weight.

In addition, in the illustrated example, as diameters $D_{A1}$ and $D_{A2}$ of the both first and second inner ring raceways 7a and 7b are set to be mutually equal ($D_{A1}=D_{A2}$), and diameters $D_{B1}$ and $D_{B2}$ of the both first and second outer ring raceways 10a and 10b are set to be mutually equal ($D_{B1}=D_{B2}$), a pitch circle diameter $PCD_1$ of each of the balls 3 (first rolling element row) provided between the first inner ring raceway 7a and the first outer ring raceway 10a and a pitch circle diameter $PCD_2$ of each of the balls 3 (second rolling element row) provided between the second inner ring raceway 7b and the second outer ring raceway 10b are set to be mutually equal ($PCD_1=PCD_2$).

When the wheel-supporting bearing unit constructed as described above is used, the coupling flange 11 is coupled and fixed to the suspension device, and the wheel and the rotating member for brake system are supported by and fixed to the mounting flange 6. As a result, the wheel and the rotating member for brake system can be rotatably supported to the suspension device.

Incidentally, mainly during the turning of the automobile, a moment load based on a road surface reaction force is applied to the above-described wheel-supporting bearing unit. At that time, as for the wheel-supporting bearing unit, the hub 1 undergoes elastic deformation so as to be bent with respect to the outer ring 2, and a center axis of the mounting flange 6 tends to be inclined with respect to a center axis of the coupling flange 11. The inclination thus produced exerts an adverse effect on the traveling stability and braking performance of the automobile. For this reason, in view of improving these performances, as the wheel-supporting bearing unit, it is desirable to adopt a structure capable of sufficiently suppressing the above-described inclination, i.e., a structure capable of sufficiently enhancing the moment rigidity.

Incidentally, the greater the distance L between points of application $P_1$ and $P_2$ of the both rolling element rows (points of intersection between the respective lines of action, $\alpha_1$ and $\alpha_2$, of the both first and second rolling element rows and a center line $\beta$ of the wheel-supporting bearing unit), the greater the moment rigidity of the wheel-supporting bearing unit. Meanwhile, the positions of the both points of application $P_1$ and $P_2$ on the center line $\beta$ move in the direction of moving away from each other as pitch circle diameters $PCD_1$ and $PCD_2$ of the both rolling element rows become large. Accordingly, the distance L between points of application $P_1$ and $P_2$ can be set to be large by increasing the pitch circle diameters $PCD_1$ and $PCD_2$ of the both rolling element rows. However, if both of these pitch circle diameters $PCD_1$ and $PCD_2$ are increased, the wheel-supporting bearing unit becomes unnecessarily large and the weight increases. This result becomes contrary to the demand for compact size and lightweight, and is therefore undesirable.

Figure 5:
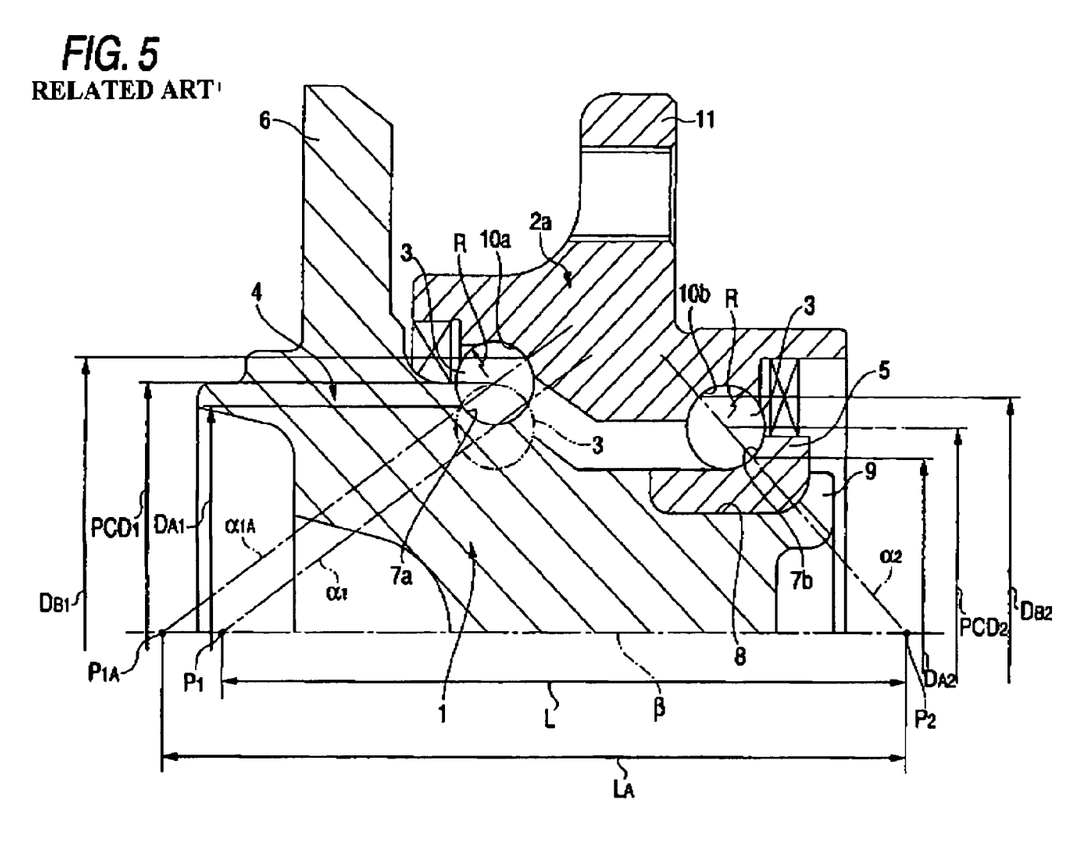
FIG. 5 is a half cross-sectional view illustrating a first example of a wheel-supporting bearing unit in which the diameter of the first outer ring raceway is greater than the diameter of the second outer ring raceway.

In contrast, patent document 1 describes a wheel-supporting bearing unit shown in FIG. 5. In comparison with the structure shown in FIG. 4, in the structure shown in FIG. 5, only the pitch circle diameter $PCD_1$ of the first rolling element row is set to be large ($PCD_1>PCD_2$) by increasing the diameters $D_{A1}$ and $D_{B1}$ of the first inner and outer ring raceways 7a and 10a without changing the pitch circle diameter $PCD_2$ of the second rolling element row. As a result, the point of application $P_{1A}$ of the first rolling element row is moved away from the point of application $P_2$ of the second rolling element row so as to enlarge the distance $L_A$ between these both points of application $P_{1A}$ and $P_2$ ($L_A>L$), thereby enhancing the moment rigidity of the wheel-supporting bearing unit. In the wheel-supporting bearing unit thus constructed, since only the $PCD_1$ is set to be large to enhance the moment rigidity, it is possible to prevent the wheel-supporting bearing unit from becoming unnecessarily large and its weight from increasing.

Figure 6:
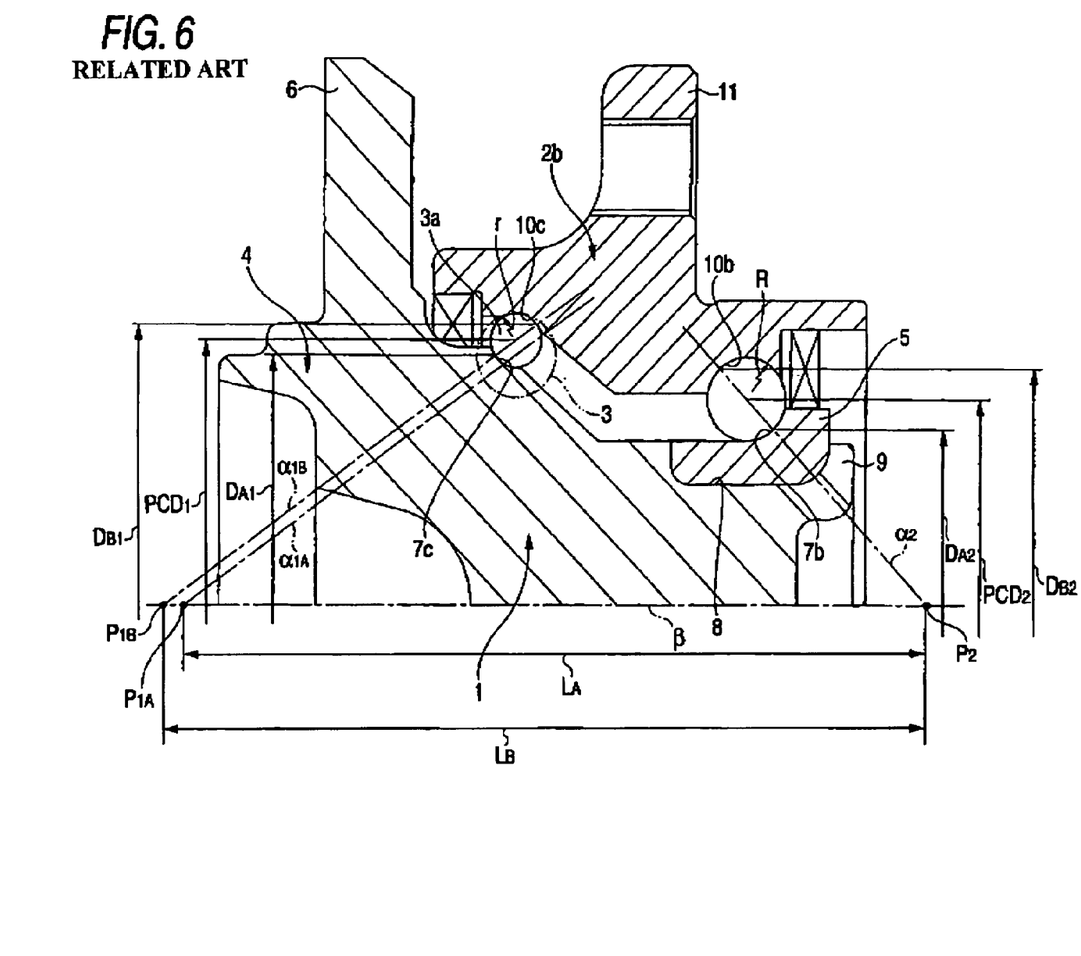
FIG. 6 is a half cross-sectional view illustrating a second example thereof.

In addition, the above-described patent document 1 also describes a wheel-supporting bearing unit shown in FIG. 6. In comparison with the structure shown in FIG. 5, in the structure shown in FIG. 6, only the diameter $D_{A1}$ of a first inner ring raceway 7c is made large and the diameter of each ball 3a constituting the first rolling element row is made small without changing the diameter $D_{B1}$ of a first outer ring raceway 10c. As a result, by making the pitch circle diameter $PCD_1$ of this first rolling element row even larger to move the point of application $P_{1B}$ of this first rolling element row further away from the point of application $P_2$ of the second rolling element row, thereby further enlarging the distance $L_B$ between these both points of application $P_{1B}$ and $P_2$ ($L_B > L_A$). By adopting such a construction, the moment rigidity of the wheel-supporting bearing unit is further enhanced.

It should be noted that, in the structure shown in FIG. 6, the total number of these balls 3a is increased by the portion by which the diameter of each ball 3a constituting the first rolling element row is made small, to thereby make it possible to disperse the load applied to these balls 3a. In addition, in the structures shown in FIGS. 4 and 5, the radii of curvature of cross-section profiles of the first and second outer ring raceways 10a and 10b are respectively R and are equal. However, in the structure shown in FIG. 6, as the diameter of each ball 3a constituting the first rolling element row is made small, as described above, the radius of curvature "r" of the cross-section profile of the first outer ring raceway 10c is smaller than the radius of curvature "R" of the cross-section profile of the second outer ring raceway 10b (r<R). In any cases, in the wheel-supporting bearing unit thus constructed, as compared with the structure shown in FIG. 5, since the diameter of the first outer ring raceway 10c is not changed, it is possible to maintain the same outside diameter dimension as that of the structure shown in FIG. 5 while enhancing the moment rigidity.

When the outer rings 2, 2a and 2b constituting the various wheel-supporting bearing units described above are manufactured, the both first and second outer ring raceways 10a (10c) and 10b are respectively subjected to a grinding process as a finishing process. As a specific grinding method, patent document 2 describes a method in which the grinding process is sequentially carried out with respect to the both first and second outer ring raceways 10a (10c) and 10b one by one. However, if such a method is carried out, the operational efficiency deteriorates since the Labor of providing the grinding process for the both outer ring raceways 10a (10c) and 10b becomes cumbersome and complicated.

On the other hand, the aforementioned patent document 2 describes a method which is aimed at the structure shown in FIG. 4 {the structure in which the diameters $D_{B1}$ and $D_{B2}$ of the first outer ring raceway 10a and the second outer ring raceway 10b are mutually equal ($D_{B1} = D_{B2}$)} and in which the both outer ring raceways 10a and 10b are simultaneously subjected to the grinding process by one grinding tool having a grinding wheel portion for grinding the first outer ring raceway 10a and a grinding wheel portion for grinding the second outer ring raceway 10b. According to such a method, it is possible to improve the operational efficiency at the time of subjecting the both outer ring raceways 10a and 10b to the grinding process and attain a reduction in the cost of the fabrication apparatus. However, the above-described method is aimed at the structure shown in FIG. 4 (the structure in which $D_{B1} = D_{B2}$) and is not aimed at the structures shown in FIGS. 5 and 6 (the structures in which $D_{B1} > D_{B2}$). In other words, the aforementioned patent document 2 does not describe a specific operational procedure which is aimed at the structures shown in FIGS. 5 and 6 (the structures in which $D_{B1} > D_{B2}$) and when the both first and second outer ring raceways 10a (10c) and 10b are simultaneously subjected to the grinding process.

In addition, when the outer rings 2, 2a and 2b constituting the various wheel-supporting bearing units described above are manufactured, in general, the both first and second outer ring raceways 10a (10c) and 10b are respectively subjected to a high-frequency quenching process as a hardening process. In the case where such a high-frequency quenching process is provided, the both first and second outer ring raceways 10a (10C) and 10b are subjected to high-frequency heating. As a specific heating method, patent document 3 describes a method which is aimed at the structure shown in FIG. 4 (the structure in which $D_{B1} = D_{B2}$) and in which the both outer ring raceways 10a and 10b are simultaneously subjected to high-frequency heating by a high-frequency heating coil having a coil portion for heating the first outer ring raceway 10a and a coil portion for heating the second outer ring raceway 10b. However, this method is aimed at the structure shown in FIG. 4 (the structure in which $D_{B1} = D_{B2}$) and is not aimed at the structures shown in FIGS. 5 and 6 (the structures in which $D_{B1} > D_{B2}$). In other words, the aforementioned patent document 3 does not describe a specific operational procedure which is aimed at the structures shown in FIGS. 5 and 6 (the structures in which $D_{B1} > D_{B2}$) and when the both first and second outer ring raceways 10a (10c) and 10b are simultaneously subjected to high-frequency heating.

[Patent Document 1] Japanese Patent Unexamined Publication JP-A-2004-108449
[Patent Document 2] Japanese Patent Unexamined Publication JP-A-2004-92830
[Patent Document 3] Japanese Patent Unexamined Publication JP-A-59-226118

DISCLOSURE OF THE INVENTION

Problems that the Invention is to Solve

In view of the above-described circumstances, the manufacturing method of an outer ring for a bearing unit of the present invention has been devised by being aimed at an outer ring in which the diameter of one outer ring raceway is greater than the diameter of the other outer ring raceway, to ensure that when these both outer ring raceways are subjected to the grinding process or these both outer ring raceways are subjected to high-frequency heating, these operations can be carried out easily.

Means for Solving the Problems

A manufacturing method of an outer ring for a bearing unit of the invention is a manufacturing method of an outer ring for a bearing unit which has double-row outer ring raceways on an inner peripheral surface thereof and in which a diameter of one of the both outer ring raceways is set to be greater than a diameter of another one of the both outer ring raceways.

According to the manufacturing method of a first aspect of the invention, as a grinding tool for subjecting these both outer ring raceways to a grinding process, one is adopted which has a first grinding wheel portion whose outer peripheral surface is formed as a first working surface (a working surface in which, for example, a radius of curvature of its cross-section profile is set to be equal to a radius of curvature of a cross-section profile of the one outer ring raceway) for grinding the one outer ring raceway and a second grinding wheel portion whose outer peripheral surface is formed as a second working surface (a working surface in which, for example, a radius of curvature of its cross-section profile is set to be equal to a radius of curvature of a cross-section profile of the other outer ring raceway) for grinding the other outer ring raceway and the first and second working surfaces come into contact with the outer ring raceways, respectively. Further, when subjecting the both outer ring raceways to the grinding process by the grinding tool, this grinding tool is caused to enter a radially inner side of the outer ring through an opening which is on a side where the diameter of the outer ring raceway is greater with respect to an axial direction (on a side close to the one outer ring raceway) between openings at both ends of the outer ring.

When the invention according to this first aspect of the invention is carried out, according to a second aspect of the invention, the grinding tool is adopted in which a diameter of the first working surface is set to be greater than a diameter of the second working surface and a difference in diameter between the both working surfaces is set to be substantially equal to a difference in diameter between the both outer ring raceways. Furthers when the both outer ring raceways are subjected to the grinding process by the grinding tool, it is possible to adopt a method in which the first working surface and the second working surface are respectively brought into contact with the one outer ring raceway and the other outer ring raceway while setting a center axis of the grinding tool to be parallel with a center axis of the outer ring.

Alternatively, according to a third aspect of the invention, as the grinding tool, one is adopted in which a diameter of the first working surface and a diameter of the second working surface are set to be equal to each other. Further, when the both outer ring raceways are subjected to the grinding process by the grinding tool, it is also possible to adopt a method in which the first working surface and the second working surface are respectively brought into contact with the one outer ring raceway and the other outer ring raceway while inclining a center axis of the grinding tool with respect to a center axis of the outer ring.

In addition, when any one of the first through third aspects of the invention is carried out, preferably, according to a fourth aspect of the invention, the grinding tool is used in which at least one property among a grain size (size of abrasive grain), a grade (strength for bonding abrasive grains) and a structure {ratio of the volume of abrasive grains to an apparent volume of the grinding wheel (percentage of grain)} of grinding wheels constituting the first and the second grinding wheel portions is made mutually different.

The reason for this is that if at least one property among the grain size, the grade and the structure of the grinding wheels constituting the first and the second grinding wheel portions is made mutually different in relation to, for example, the difference in diameter between the pair of outer ring raceways and the difference in diameter between the both first and second working surfaces (after taking these differences in diameter into consideration), the tendencies of occurrence of shedding or clogging of the both first and second working surfaces can be made to approach each other (can be made substantially equal) as compared with a case where the property is not made mutually different.

Here, a description will be given of the shedding and clogging. Grinding wheels constituting the both first and second grinding wheel portions have a characteristic of undergoing self-sharpening action. This self-sharpening action means an action in which when the cutting edge of abrasive grains exist on the working surface of the grinding wheel has become worn and dulled, those abrasive grains fall off this working surface and new abrasive grains appear on this working surface. In the grinding wheel, this self-sharpening action takes place appropriately and the grinding capability of the working surface can be maintained substantially at desired performance. However, unless the grinding wheel having appropriate properties is selected and used in relation to the kind of the workpiece and the working conditions, shedding or clogging tends to occur in the working surface of this grinding wheel.

Here, the shedding of the working surface mentions a state in which the aforementioned self-sharpening action becomes excessively likely to occur and the surface to be worked cannot be ground sufficiently. If the grinding operation of the surface to be worked is continued in the state in which such shedding of the working surface has occurred, the cross-section profile of this working surface deteriorates (the surface becomes excessively coarse) and defects such as the occurrence of vibrations at the grinding portion are produced.

Meanwhile, the aforementioned clogging of the working surface mentions a state in which the self-sharpening action has become excessively unlikely to occur and the surface to be worked cannot be ground sufficiently. If continuing the grinding operation of the surface to be worked while occurring such clogging of the working surface, the grinding resistance increases and the amount of heat generated at the grinding portion becomes large, so that defects such as the occurrence of grinding burn, grinding crack and thermal strain at the surface to be worked are produced.

When carrying out the above-described fourth aspect of the invention is carried out, preferably, appropriate grinding wheels are selected according to the following point system. Namely, in this point system, when the diameter of one outer ring raceway is greater than the diameter of the other outer ring raceway by 1%, then add −0.1 point and when the diameter of the first working surface is greater than the diameter of the second working surface by 1%, then add +0.1 point.

Further, with respect to #4 to #8000 (as the step moves from #4 toward #8000, the abrasive grains become smaller) in the steps of the grain size of grinding wheels, as shown in Table 1 below, which are stipulated in the JIS (Japanese Industrial Standard) Standard (JIS R 6210) (in JIS R 6210, these steps are expressed as "FOCO" (OOO is the size of meshes for sieving the abrasive grains) as for fine powders for general polishing and is expressed as "No. OOO" as for fine powders for precision polishing; however, since only the grain size is in question here, the steps are expressed as "#OOO" in Table 1), −1.0 point is added each time the grain size of the grinding wheel constituting the first grinding wheel portion deviates by 1 step in the direction from #8000 to #4 (in the direction in which the abrasive grains become larger) relative to the grain size of the grinding wheel constituting the second grinding wheel portion. Conversely, +1.0 point is added each time it deviates by 1 step in the direction from #4 to #8000 (in the direction in which the abrasive grains become smaller).

TABLE 1

| #4, #5, #6, #7, #8, #10, #12, #14, #16, #20, |
| #22, #24, #30, #36, #40. #46, #54, #60, #70, |
| #80, #90, #100, #120, #150, #180, #220, |
| #230, #240, #280, #320, #360, #400, #500, |
| #600, #700, #800, #1000, #1200, #1500, |
| #2000, #2500, #3000, #4000, #6000, #8000 |

In addition, with respect to steps A to Z of the grade (as the step moves from A toward Z, the bonding become stronger) of grinding wheels, as shown in Table 2 below, which are stipulated in the JIS Standard (JIS R 6210), −1.0 point is added each time the grade of the grinding wheel constituting the first grinding wheel portion deviates by 1 step in the direction from Z to A (in the direction in which the bonding become weaker) relative to the grade of the grinding wheel constituting the second grinding wheel portion and +1.0 point is added each time it deviates by 1 step in the direction from A to Z (in the direction in which the bonding become stronger).

TABLE 2

| Super Soft | Soft | Medium | Hard | Super Hard |
|---|---|---|---|---|
| A, B, C, D, E, F, G | H, I, J, K | L, M, N, O | P, Q, R, S | T, U, V, W, X, Y, Z |

Furthermore, with respect to steps of the structure (structure numbers) 0 to 14 {as the step moves from 0 toward 14, the structure become coarser (the percentage of grain becomes lower)} of grinding wheels, as shown in Table 3 below, which are stipulated in the JIS Standard (JIS R 6210), −1.0 point is added each time the structure of the grinding wheel constituting the first grinding wheel portion deviates by 1 step in the direction from 0 to 14 (in the direction in which the percentage of grain becomes lower) relative to the structure of the grinding wheel constituting the second grinding wheel portion and +1.0 point is added each time it deviates by 1 step in the direction from 14 to 0 (in the direction in which the percentage of grain becomes higher).

TABLE 3

| Structure No. | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Percentage of Grain(%) | 62 | 60 | 58 | 56 | 54 | 52 | 50 | 48 | 46 | 44 | 42 | 40 | 38 | 36 | 34 |
| Allowance(%) | | | | | | | ±1.5 | | | | | | | | |

Then, when such a point system is introduced, preferred conditions of the grinding wheels in which shedding or clogging is unlikely to occur are appropriately selected after ensuring that the total point falls within the range of −1.0 to +1.0.

In addition, according to the manufacturing method described in a fifth aspect of the invention, as a high-frequency heating tool for the both outer ring raceways which is used for subjecting the both outer ring raceways to high-frequency quenching treatment, one is adopted which has a first coil portion for subjecting the one outer ring raceway to high-frequency heating and a second coil portion for subjecting the other outer ring raceway to high-frequency heating and which is capable of simultaneously causing an outer peripheral surface of the first coil portion and an outer peripheral surface of the second coil portion to respectively oppose in close proximity the one outer ring raceway and the other outer ring raceway. Then, when subjecting the both outer ring raceways to high-frequency heating by this high-frequency heating tool, this high-frequency heating tool is caused to enter a radially inner side of the outer ring through that opening which is on a side where the diameter of the outer ring raceway is greater with respect to an axial direction (on a side close to the one outer ring raceway) between openings at both ends of the outer ring.

Advantages of the Invention

According to the above-described manufacturing method of an outer ring for a bearing unit of the invention, the grinding tool and the high-frequency heating tool can be easily made to enter the radially inner side of the outer ring for the bearing unit. The reason is that, between the openings at the both ends of the outer ring for the bearing unit, the opening on the side where the diameter of the outer ring raceway is large (on the side close to the one outer ring raceway) has a greater opening area than the opening on the side where it is small (on the side close to the other outer ring raceway). Namely, when the grinding tool or the high-frequency heating tool is made to enter the radially inner side of the outer ring for the bearing unit, a portion of the grinding tool or the high-frequency heating tool and a portion (a peripheral edge portion of the opening, a stepped portion which is present on the inner peripheral surface, or the like) of the outer ring for the bearing unit are unlikely to interfere with each other (difficult to collide against each other) when the grinding tool or the high-frequency heating tool is made to enter through the opening (opening area: large) on the side close to the one outer ring raceway than when it is made to enter through the opening (opening area: small) on the side close to the other outer ring raceway.

Further, according to the invention, even it the grinding tool and the high-frequency heating tool become slightly large in size, it becomes possible to allow the grinding tool and the high-frequency heating tool to enter the radially inner side of the outer ring for the bearing unit by the portion by which the grinding tool and the high-frequency heating tool are made to enter through the opening having a large opening area (the opening on the side close to the one outer ring raceway) in comparison with the case where they are made to enter through the opening having a small opening area (the opening on the side close to the other outer ring raceway). Accordingly, when the manufacturing method of the invention is carried out, it is possible to enlarge the degree of freedom in designing the grinding tool and the high-frequency heating tool used.

Furthers according to the invention, the operation of subjecting the both outer ring raceways to the grinding process (first aspect of the invention) or the operation of subjecting these both outer ring raceways to high-frequency heating (fifth aspect of the invention) can be performed simultaneously with respect to these both outer ring raceways. For this reason, these operations can be executed efficiently.

When carrying out the invention, if the manufacturing method shown in fourth aspect of the invention is adopted, the tendencies of occurrence of clogging or the tendencies of shedding of the both first and second working surfaces can be made mutually substantially equal. For this reason, it becomes possible to hardly occur a situation in which clogging or shedding occurs only in one of the both first and second working surfaces or a situation in which clogging occurs in either one working surface and shedding occurs in the other working surface. Accordingly, the setting of conditions when the pair of outer ring raceways are both subjected to grinding is facilitated.

Specifically, if the aforementioned total point falls within the range of −1.0 to +1.0, the both first and second working surfaces show mutually the same reaction with respect to the change of grinding parameters (e.g., feed speed, peripheral speeds of the grinding wheels and the workpiece, etc.), so that it easily becomes possible to discover satisfactory grinding conditions.

In addition, although the grinding wheel becomes gradually smaller as grinding is carried out, changes in the tendencies of occurrence of shedding and clogging accompanying the same appear similarly for the both first and second working surfaces, so that readjustment can be easily conducted.

DESCRIPTION OF REFERENCE NUMERALS AND SIGNS

| | |
|---|---|
| 1: | hub |
| 2, 2a, 2b: | outer ring |
| 33a: | ball |
| 4: | hub body |
| 5: | inner ring |
| 6: | mounting flange |
| 7a, 7b, 7c: | inner ring raceway |
| 8: | small-diameter stepped portion |
| 9: | caulked portion |
| 10a, 10b, 10c: | outer ring raceway |
| 11: | coupling flange |
| 12, 12a: | grinding tool |
| 13: | rotating shaft |
| 14: | first grinding wheel |
| 15: | second grinding wheel |
| 16, 16a: | first working surface |
| 17, 17a: | second working surface |
| 18: | shoulder portion |
| 19: | undercut |
| 20: | high-frequency heating tool |
| 21: | supporting shaft |
| 22: | first coil |
| 23: | second coil |

BEST MODE FOR CARRYING OUT THE INVENTION

First Embodiment

FIG. 1 shows a first embodiment of the invention corresponding to first and second aspects of the invention. An outer ring $2b$ to be manufactured is a component member of the wheel-supporting bearing unit shown in FIG. 6. Namely, this outer ring 2 has a first and a second outer ring raceway $10c$ and $10b$ formed in its inner peripheral surface and a coupling flange 11 formed on its outer peripheral surface for coupling to a suspension device. In addition, the diameter $D_{B1}$ of the first outer ring raceway $10c$ is set to be greater than the diameter $D_{B2}$ of the second outer ring raceway $10b$ ($D_{B1} > D_{B2}$) and the radius of curvature "r" of the cross-section profile of the first outer ring raceway $10c$ is set to be smaller than the radius of curvature "R" of the cross-section profile of the second outer ring raceway $10b$ ($r < R$).

A grinding tool 12, which is used for subjecting the both outer ring raceways $10c$ and $10b$ to a grinding process, is formed such that a first grinding wheel 14 and a second grinding wheel 15 formed annularly are respectively joined and fixed to an intermediate portion and a leading end portion (a right end portion in FIG. 1) of a rotating shaft 13 concentrically with the rotating shaft 13, respectively. In such a grinding tool 12, an outer peripheral surface of the first grinding wheel 14 is formed as a first working surface 16 whose radius of curvature of a cross-section profile is set to be equal to the radius of curvature of the cross-section profile of the first outer ring raceway $10c$ (set to r). In addition, an outer peripheral surface of the first grinding wheel 14 is formed as a second working surface 17 whose radius of curvature of a cross-section profile is set to be equal to the radius of curvature of the cross-section profile of the second outer ring raceway $10b$ (set to R). In addition, the outside diameter $d_{16}$ of the first working surface 16 is set to be greater than the outside diameter $d_{17}$ of the second working surface 17 ($d_{16} > d_{17}$) and a difference ($d_{16} - d_{17}$) in outside diameter between these both first and second working surfaces 16 and 17 is set to be substantially equal to a difference ($D_{B1} - D_{B2}$) in diameter between the both first and second outer ring raceways $10c$ and $10b$ ($d_{16} - d_{17} = D_{B1} - D_{B2}$). Furthermore, the pitch between the both first and second working surfaces 16 and 17 with respect to the axial direction is defined such that the both first and second working surfaces 16 and 17 are simultaneously brought into registration and contact with the both first and second outer ring raceways $10c$ and $10b$ in a state in which a center axis of the grinding tool 12 and a center axis of the outer ring $2b$ are set parallel to each other, as shown in FIG. 1(C) which will be referred to later.

Figure 1A:
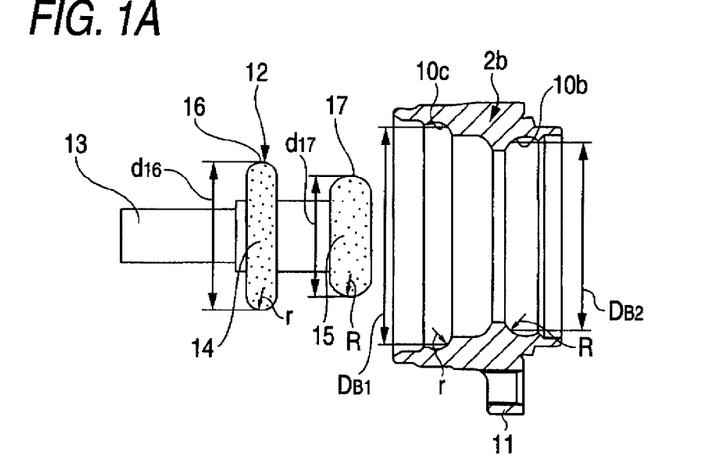
FIG. 1 is a side elevational view illustrating steps of operation according to a first embodiment of the invention in a state in which only an outer ring is sectioned.

In this embodiment, when the both first and second outer ring raceways $10c$ and $10b$ are subjected to the grinding process by using such a grinding tool 12, first, as shown in FIG. 1(A), in a state in which the center axis of the grinding tool 12 is aligned with the center axis of the outer ring $2b$, a leading end portion of this grinding tool 12 is made to oppose that opening which is on the side close to the first outer ring raceway $10c$ with respect to the axial direction in openings at both ends of the outer ring $2b$.

Figure 1B:
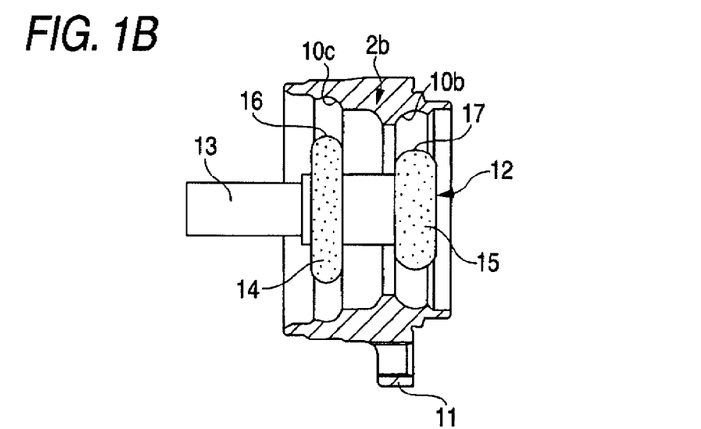

Then, as shown in FIGS. 1(A) to 1(B), as the grinding tool 12 is advanced in the axial direction toward the outer ring $2b$, this grinding tool 12 is made to enter the radially inner side of the outer ring $2b$ through the opening on the side close to the first outer ring raceway $10c$. Further, in the state in which the grinding tool 12 is thus advanced, phases of the both first and second outer ring raceways $10c$ and $10b$ and phases of the both first and second working surfaces 16 and 17 with respect to the axial direction are respectively aligned with each other.

Figure 1C:
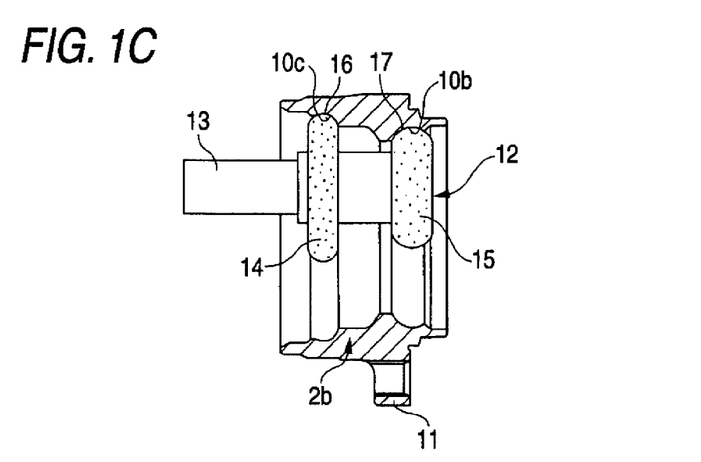

Next, as shown in FIGS. 1(B) to 1(C), as the grinding tool 12 is radially displaced on the inner side of the outer ring $2b$, the first working surface 16 and the second working surface 17 are respectively pressed against the first outer ring raceway $10c$ and the second outer ring raceway $10b$. Then, in this state, the outer ring $2b$ and the grinding tool 12 are caused to rotate relative to each other {for example, they are rotated in mutually opposite directions, or rotated in mutually the same direction with their rotational speeds (peripheral speeds) varied}, thereby subjecting the both first and second outer ring raceways $10c$ and $10b$ to the grinding process over their entire circumferences.

As described above, in the manufacturing method of the outer ring for the bearing unit in this embodiment, the grinding tool 12 is made to enter the radially inner side of the outer ring 2b through the opening on the side close to the first outer ring raceway 10c in the openings at both ends of this outer ring 2b. For this reason, the grinding tool 12 can be easily made to enter the radially inner side of the outer ring 2b. The reason is that, in the openings at the both ends of the outer ring 2b, the opening on the side close to the first outer ring raceway 10c has a greater opening area than the opening on the side close to the second outer ring raceway 10b. Namely, when the grinding tool 12 is made to enter the radially inner side of the outer ring 2b, a portion of the grinding tool 12 and a portion (a peripheral edge portion of the opening, a stepped portion which is present on the inner peripheral surface, or the like) of the outer ring 2b are unlikely to interfere with each other (difficult to collide against each other) when the grinding tool 12 is made to enter through the opening (opening area: large) on the side close to the first outer ring raceway 10c than when it is made to enter through the opening (opening area: small) on the side close to the second outer ring raceway 10b.

In addition, in this embodiment, the both first and second outer ring raceways 10c and 10b can be simultaneously subjected to the grinding process by the grinding tool 12. For this reason, it is possible to improve the operational efficiency at the time of subjecting these both first and second outer ring raceways 10c and 10b to the grinding process.

Incidentally, if the properties {grain size (above-mentioned Table 1), grade (above-mentioned Table 2) and structure (above-mentioned Table 3)} of the both first and second grinding wheels 14 and 15 are made mutually equal, tendencies of occurrence of clogging or shedding of the both first and second working surfaces 16 and 17 become greatly different from each other. Hence, there is a possibility that the setting of conditions at the time of simultaneously grinding the both first and second outer ring raceways 10c and 10b becomes difficult. The reason for this will be described hereafter.

First, the properties (grain size, grade and structure) of the both first and second grinding wheels 14 and 15 exert the following effect on the tendencies of occurrence of shedding or clogging of the both first and second working surfaces 16 and 17.

First, as for the grain size, the greater the number and the smaller the grain diameter (as the step of the grain size moves from #4 toward #8000 in the above-mentioned Table 1), the more the clogging is likely to occur, whereas the smaller the number and the greater the grain diameter (as the step of the grain size moves from #8000 toward #4 in the same Table 1), the more the shedding is likely to occur.

In addition, as for the grade, the stronger the binding (as the step of the grade moves from A toward Z in the above-mentioned Table 2), the more the clogging is likely to occur, whereas the weaker the binding (as the step of the grade moves from Z toward A in the same Table 2), the more the shedding is likely to occur.

In addition, as for the structure, the coarser the structure {as the step of the structure (structure number) moves from 0 toward 14 in the above-mentioned Table 3}, the more the shedding is likely to occur, whereas the denser the structure {as the step of the structure (structure number) moves from 14 toward 0 in the same Table 3}, the more the clogging is likely to occur.

In addition, in general, the peripheral speed of the working surface of the grinding wheel and the diameter of the surface to be worked respectively exert the following effects on the tendencies of occurrence of shedding or clogging.

First, the higher the peripheral speed of the working surface of the grinding wheel, the more the clogging is likely to occur.

In addition, the greater the diameter of the surface to be worked, the more the shedding is likely to occur.

In contrast, in this embodiment, the diameters $d_{16}$ and $d_{17}$ (peripheral speeds) of the both first and second working surfaces 16 and 17 are mutually different ($d_{16} > d_{17}$) and the diameters $D_{B1}$ and $D_{B2}$ of the both first and second outer ring raceways 10c and 10b (surfaces to be processed) are mutually different ($d_{16} > d_{17}$). For this reason, if the properties (grain size, grade and structure) of the both first and second grinding wheels 14 and 15 are made mutually equal, the tendencies of occurrence of clogging or tendencies of occurrence of shedding of the both first and second working surfaces 16 and 17 become substantially different from each other. Hence, there is a possibility that the setting of conditions when simultaneously grinding the both first and second outer ring raceways 10c and 10b becomes difficult.

Accordingly, in order to prevent the occurrence of such a drawback, when this embodiment is carried out, it is preferable to make at least one property among the grain size, grade and structure of the both first and second grinding wheels 14 and 15 mutually different in relation to the difference in diameter ($D_{B1} - D_{B2}$) between the both first and second outer ring raceways 10c and 10b and the difference in diameter ($D_{16} - D_{17}$) between the both first and second working surfaces 16 and 17, as described in the fourth aspect of the invention, to thereby make mutually substantially equal the tendencies of occurrence of shedding or clogging of the both first and second working surfaces 16 and 17. Namely, it is preferable to match the grinding tendencies of the both first and second working surfaces 16 and 17 so that when grinding parameters (e.g., feed speed, peripheral speeds of the grinding wheels and the workpiece, etc.) are changed, effects appear in the same direction (to ensure that adjustment is facilitated just as in the case of performing grinding with a single working surface). It should be noted that a specific method of thus making mutually substantially equal the tendencies of occurrence of shedding or clogging of the both first and second working surfaces 16 and 17 will be described in Example 1 which will be described later.

Second Embodiment

Figure 2A:
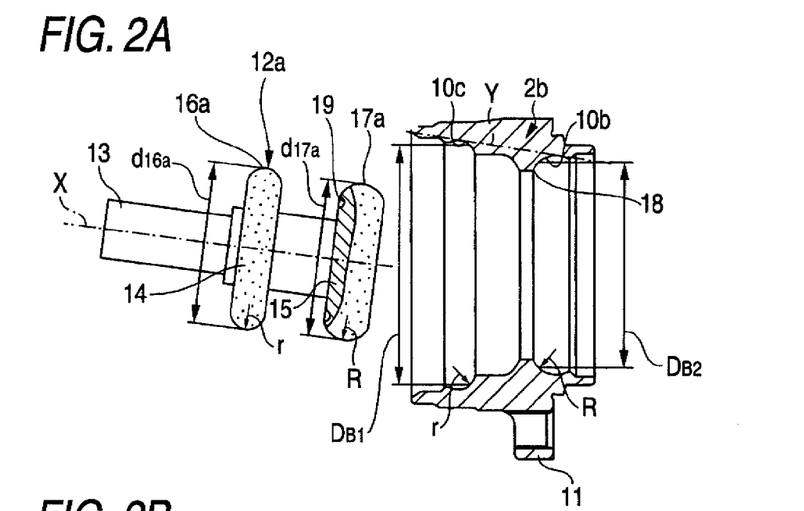
FIG. 2 is a side elevational view illustrating steps of operation according to a second embodiment in a state in which only the outer ring and a portion of a grinding tool are sectioned.
Figure 2B:
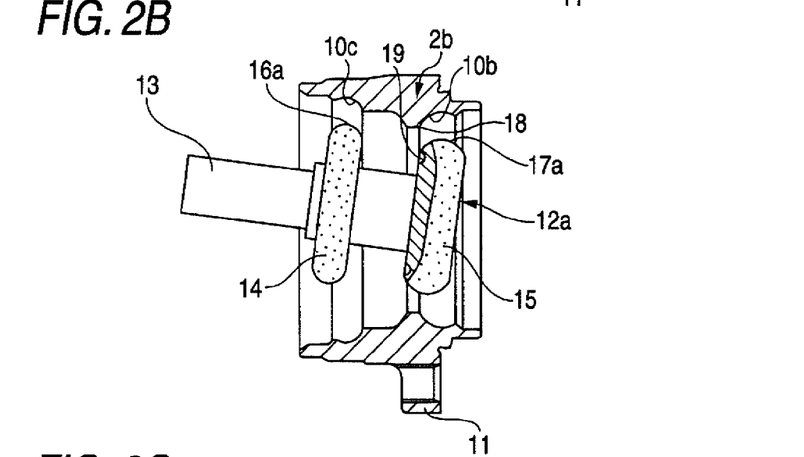
Figure 2C:
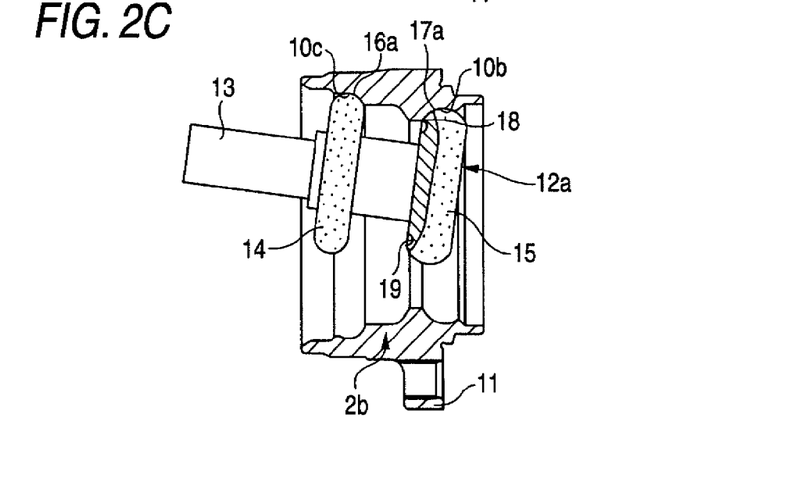

Next, FIG. 2 shows a second embodiment of the invention corresponding to first through third aspects of the invention. In this embodiment, an outside diameter $d_{16a}$ of a first working surface 16a and an outside diameter $d_{17a}$ of a second working surface 17a, which surfaces constitute a grinding tool 12a, are made mutually equal ($d_{16a} = d_{17a}$). In addition, the pitch between the both first and second working surfaces 16a and 17a with respect to the axial direction is defined such that the both first and second working surfaces 16a and 17a are simultaneously brought into registration and contact with the both first and second outer ring raceways 10c and 10b in a state in which a center axis of the grinding tool 12a is inclined with respect to the center axis of the outer ring 2b, as shown in FIG. 2(C) which will be referred to later.

In this embodiment, when the both first and second outer ring raceways 10c and 10b are subjected to the grinding process by using such a grinding tool 12a, first, as shown in FIG. 2(A), in a state in which the center axis of the grinding tool 12a is inclined with respect to the center axis of the outer ring 2b (in a state in which a center axis X of this grinding tool 12a is set parallel to a common tangential line Y drawn at those portions of the both first and second outer ring raceways 10c and 10b with which the both first and second working surfaces 16a and 17a are brought into contact during the grinding process), the leading end portion of this grinding tool 12a is opposed to an opening which is on the side close to the first outer ring raceway 10c with respect to the axial direction in openings at both ends of the outer ring 2b.

Then, as shown in FIGS. 2(A) to 2(B), as the grinding tool 12a is oriented toward the outer ring 2b and is advanced in the axial direction of this outer ring 2b, this grinding tool 12a is made to enter the radially inner side of the outer ring 2b through the opening on the side close to the first outer ring raceway 10c. Further, in the state in which the grinding tool 12a is thus advanced, phases of the both first and second outer ring raceways 10c and 10b and phases of the both first and second working surfaces 16a and 17a with respect to the axial direction of the outer ring 2b are respectively aligned with each other.

Next, as shown in FIGS. 2(B) to (2(C), as the grinding tool 12a is displaced on the inner side of the outer ring 2b in the radial direction of this outer ring 2b, the first working surface 16a and the second working surface 17a are respectively pressed against the first outer ring raceway 10c and the second outer ring raceway 10b. It should be noted that, in this embodiment, to ensure that an edge portion of the second working surface 17a does not interfere with a shoulder portion 18 of the second outer ring raceway 10b when the second working surface 17a is thus pressed against the second outer ring raceway 10b, an undercut 19 is formed over the entire circumference of the edge portion of the second working surface 17a. In this embodiment, the procedure of the subsequent grinding operation and the construction, operation and effects of the other portions are similar to those of the case of the above-described first embodiment. It should be noted that, concerning the structure of this embodiment, a specific method of making mutually substantially equal the tendencies of occurrence of shedding or clogging of the both first and second working surfaces 16a and 17a will be described in Example 2 which will be described later.

It should be noted that, in the above-described first and second embodiments, a method in which only the both first and second outer ring raceways 10c and 10b are simultaneously subjected to the grinding process is adopted. However, when the invention is carried out, it is also possible to subject another portion of the surface of the outer ring 2b (e.g., a portion to which a seal ring is fitted or with which it is brought in sliding contact) to the grinding process simultaneously with the grinding process of the both first and second outer ring raceways 10c and 10b. In this case, a grinding wheel portion for subjecting the other portion to the grinding process is provided on a portion of the grinding tool.

Third Embodiment

Next, FIG. 3 shows a third embodiment of the invention corresponding to fifth aspect of the invention. In this embodiment as well, the outer ring 2b to be manufactured is a component member of the wheel-supporting bearing unit shown in FIG. 6. Namely, this outer ring 2 has the first and the second outer ring raceway 10c and 10b formed in its inner peripheral surface and the coupling flange 11 formed on its outer peripheral surface for coupling to the suspension device. In addition, the diameter $D_{B1}$ of the first outer ring raceway 10c is set to be greater than the diameter $D_{B2}$ of the second outer ring raceway 10b ($D_{B1} > D_{B2}$) and the radius of curvature "r" of the cross-section profile of the first outer ring raceway 10c is set to be smaller than the radius of curvature "R" of the cross-section profile of the second outer ring raceway 10b ($r < R$).

In addition, a high-frequency heating tool 20, which is used for subjecting the both outer ring raceways 10c and 10b to high-frequency heating so as to be used for subjecting the both outer ring raceways 10c and 10b to high-frequency quenching treatment, is formed such that a first coil 22 and a second coil 23 formed annularly are respectively supported on an intermediate portion and a leading end portion (a lower end portion in FIG. 3) of a supporting shaft 21 concentrically with the supporting shaft 21, respectively. In such a high-frequency heating tool 20, the widthwise dimension $W_{22}$ of the first coil 22 is set to be slightly greater than the widthwise dimension $W_{10c}$ of the first outer ring raceway 10c ($W_{22} > W_{10c}$), while the widthwise dimension $W_{23}$ of the second coil 23 is set to be slightly greater than the widthwise dimension $W_{10b}$ of the first outer ring raceway 10b ($W_{23} > W_{10b}$). In addition, the outside diameter $d_{22}$ of the first coil 22 is set to be greater than the outside diameter $d_{23}$ of the second coil 23 ($d_{22} > d_{23}$) and a difference ($d_{22} - d_{23}$) in outside diameter between these both first and second coils 22 and 23 is set to be substantially equal to a difference ($D_{B1} - D_{B2}$) in diameter between the both first and second outer ring raceways 10c and 10b ($d_{22} - d_{23} = D_{B1} - D_{B2}$). Furthermore, the pitch between the both first and second coils 22 and 23 with respect to the axial direction is set to be substantially equal to the pitch between the both first and second outer ring raceways 10c and 10b with respect to the axial direction.

Figure 3A:
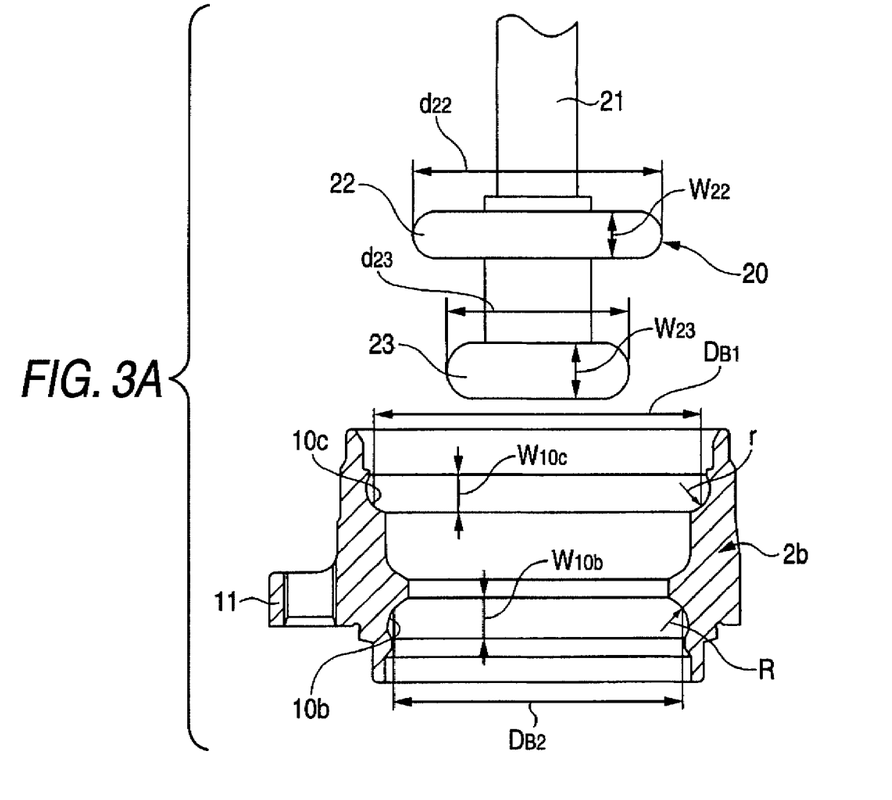
FIG. 3 is a side elevational view illustrating steps of operation according to a third embodiment in a state in which only the outer ring is sectioned.
Figure 3B:
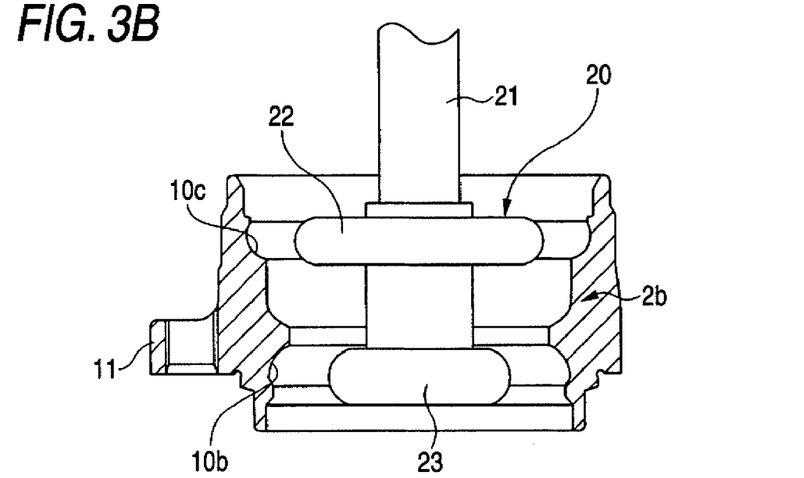

In this embodiment, when the both first and second outer ring raceways 10c and 10b are subjected to high-frequency heating by using such a high-frequency heating tool 20, first, as shown in FIG. 3(A), in a state in which the center axis of the high-frequency heating tool 20 is aligned with the center axis of the outer ring 2b, a leading end portion of this high-frequency heating tool 20 is made to oppose that opening which is on the side close to the first outer ring raceway 10c with respect to the axial direction in openings at both ends of the outer ring 2b. Then, as shown in FIG. 3(A) to 3(B), as the high-frequency heating tool 20 is advanced in the axial direction toward the outer ring 2b, this high-frequency heating tool 20 is made to enter the radially inner side of the outer ring 2b through the opening on the side close to the first outer ring raceway 10c. Further, in the state in which the high-frequency heating tool 20 is thus advanced, phases of the both first and second outer ring raceways 10c and 10b and phases of the both first and second coils 22 and 23 with respect to the axial direction are respectively substantially aligned with each other. Furthermore, the high-frequency heating tool 20 is radially displaced to allow partial outer peripheral surfaces of the both first and second coils 22 and 23 and the both first and second outer ring raceways 10c and 10b to oppose each other in close proximity. Then, in this state, the both first and second coils 22 and 23 are energized while the outer ring 2b is being rotated, thereby subjecting the both first and second outer ring raceways 10c and 10b to high-frequency heating. It should be noted that if the outside diameters of the both first and second coils 22 and 23 can be made sufficiently large to such an extent as to simultaneously oppose the both outer ring raceways 10c and 10b in close-proximity over their entire circumferences, it is unnecessary to off-center the high-frequency heating tool 20 with respect to the outer ring 2b. In this case as well, it is preferable to rotate this outer ring 2b in the light of preventing uneven heating.

As described above, in the manufacturing method of the outer ring for the bearing unit according to this embodiment, the high-frequency heating tool 20 is made to enter the radially inner side of the outer ring 2b through the opening on the side close to the first outer ring raceway 10c in the openings at both ends of this outer ring 2b. For this reason, the high-frequency heating tool 20 can be easily made to enter the radially inner side of the outer ring 2b. The reason is that, in the openings at the both ends of the outer ring 2b, the opening on the side close to the first outer ring raceway 10c has a greater opening area than the opening on the side close to the second outer ring raceway 10b. Namely, when the high-frequency heating tool 20 is made to enter the radially inner side of the outer ring 2b, a portion of the high-frequency heating tool 20 and a portion (a peripheral edge portion of the opening, a stepped portion which is present on the inner peripheral surface, or the like) of the outer ring 2b are unlikely to interfere with each other (difficult to collide against each other) when the high-frequency heating tool 20 is made to enter through the opening (opening area: large) on the side close to the first outer ring raceway 10c than when it is made to enter through the opening (opening area: small) on the side close to the second outer ring raceway 10b.

In addition, in this embodiment, the both first and second outer ring raceways 10c and 10b can be simultaneously subjected to high-frequency heating by the high-frequency heating tool 20. For this reason, it is possible to improve the operational efficiency at the time of subjecting these both first and second outer ring raceways 10c and 10b to high-frequency heating.

It should be noted that the manufacturing method of the invention can be carried out with respect to the outer ring if diameters of the pair of outer ring raceways are different, irrespective of whether or not other specifications such as the width, the radius of curvature and the like are mutually equal between these both outer ring raceways.

Example 1

In this Example, a specific description will be given of the method of making mutually substantially equal the tendencies of occurrence of shedding or clogging of the both first and second working surfaces 16 and 17 when the first embodiment shown in FIG. 1 is carried out. To make the both rates of occurrence substantially equal, the following point system is introduced in this Example.

First, by using as a reference (0 point) a state in which the properties (grain size, grade and structure) of the both first and second grinding wheels 14 and 15 are made mutually equal, −1.0 point is added each time when anyone of the properties (grain size, grade and structure) of the first grinding wheel 14 deviates by 1 step toward the side of occurrence of shedding and +1.0 point is added each time when it deviates toward the side of occurrence of clogging.

Specifically, −1.0 point is added each time when the grain size (Table 1) of the first grinding wheel 14 deviates by 1 step in the direction from #8000 to #4 (the direction in which the rate of occurrence of shedding increases) and +1.0 point is added each time when it deviates by 1 step in the direction from #4 to #8000 (the direction in which the rate of occurrence of clogging increases).

Further, −1.0 point is added each time when the grade (Table 2) of the first grinding wheel 14 deviates by 1 step in the direction from Z to A (the direction in which the rate of occurrence of shedding increases) and +1.0 point is added each time when it deviates by 1 step in the direction from A to Z (the direction in which the rate of occurrence of clogging increases).

Furthermore, 1.0 point is added each time when the structure (Table 3) of the first grinding wheel 14 deviates by 1 step in the direction from 0 to 14 (the direction in which the rate of occurrence of shedding increases) and +1.0 point is added each time when it deviates by 1 step in the direction from 14 to 0 (the direction in which the rate of occurrence of clogging increases).

In general, if the grinding stock removal per round of the working surface of the grinding wheel changes by 10%, the tendency of occurrence of shedding or occurrence of clogging of the working surface changes by the same extent as when any one of the properties (grain size, grade and structure) of this grinding wheel deviates by 1 step.

Accordingly, −0.1 point is added per 1% of rate at which the diameter $D_{B1}$ of the first outer ring raceway 10c is greater than the diameter $D_{B2}$ of the second outer ring raceway 10b (a rate at which the rate of occurrence of shedding of the first working surface 16 is higher than the rate of occurrence of shedding of the second working surface 17).

Further, +0.1 point is added per 1% of rate at which the diameter $d_{16}$ of the first working surface 16 is greater than the diameter $d_{17}$ of the second working surface 17 (a rate at which the rate of occurrence of clogging of the first working surface 16 is higher than the rate of occurrence of clogging of the second working surface 17).

Then, at least one of the properties (grain size, grade and structure) of the first grinding wheel 14 and the second grinding wheel 15 is adjusted so that the total point falls within the range of −1.0 to +1.0 when the above-described point system is introduced, thereby making mutually substantially equal the tendencies of occurrence of shedding or clogging of the both first and second working surfaces 16 and 17.

For example, in the first embodiment shown in FIG. 1, when the diameter $D_{B1}$ of the first outer ring raceway 10c is 70 mm, the diameter $D_{B2}$ of the second outer ring raceway 10b is 60 mm, the diameter $d_{16}$ of the first working surface 16 is 45 mm, the diameter $d_{17}$ of the second working surface 17 is 35 mm and the properties (grain size, grade and structure) of the first and second grinding wheels 14 and 15 are mutually equal, the total point becomes +1.1, as shown in Table 4 below. Namely, the rate of occurrence of clogging of the first working surface 16 becomes 1.1 point higher than the rate of occurrence of clogging of the second working surface 17.

TABLE 4

| Item of Evaluation | Point |
| --- | --- |
| Diameter $d_{16}$ of first working surface 16 > diameter $d_{17}$ of second working surface 17 | $+(45/35 − 1)/0.1 \approx +2.8$ |
| Diameter $D_{B1}$ of first outer ring raceway 10c > diameter $D_{B2}$ of second outer ring raceway 10b | $−(70/60 − 1)/0.1 = −1.7$ |
| Total | +1.1 |

In this case, for example, if any one of the properties (grain size, grade and structure) of the first grinding wheel 14 is offset by 1 or 2 steps to the side of occurrence of shedding (i.e., if −1.0 to −2.0 point is added), it is possible to allow the total point to fall within the range of −1.0 to +1.0. However, since the grain size is determined by the target roughness of the surface to be worked, in practice, it is preferable to offset one of the grade and the structure. For example, when any one of the properties (grain size, grade and structure) of the first grinding wheel 14 is offset by 1 step to the side of occurrence of shedding, if the properties of the second grinding wheel 15 are 100K8 (which means that the grain size is #100, the grade is K and the structure number is 8; hereinafter the same), it suffices if the properties of the first grinding wheel 15 are set to 100J8, 100J9, or the like (i.e., can be made to fall within the aforementioned range).

Example 2

In this Example, a specific description will be given of the method of making mutually substantially equal the tendencies of occurrence of shedding or clogging of the both first and second working surfaces 16a and 17a when the second embodiment shown in FIG. 2 is carried out. For this purpose, in this Example as well, a point system similar to the case of the above-described Example 1 is introduced. Then, at least one of the properties (grain size, grade and structure) of the first grinding wheel 14 and the second grinding wheel 15 is adjusted so that the total point falls within the range of −1.0 to +1.0 when the above-described point system is introduced, thereby making mutually substantially equal the tendencies of occurrence of shedding and clogging of the both first and second working surfaces 16a and 17a.

For example, in the second embodiment shown in FIG. 2, when the diameter $D_{B1}$ of the first outer ring raceway 10c is 70 mm, the diameter $D_{B2}$ of the second outer ring raceway 10b is 60 mm and the diameter $d_{16}$ of the first working surface 16a and the diameter $d_{17}$ of the second working surface 17a are respectively 35 mm and the properties (grain size, grade and structure) of the first and second grinding wheels 14 and 15 are mutually equal, the total point becomes −1.7, as shown in Table 5 below. Namely, the rate of occurrence of shedding of the first working surface 16a becomes 1.7 point higher than the rate of occurrence of shedding of the second working surface 17a.

TABLE 5

| Item of Evaluation | Point |
|---|---|
| Diameter $d_{16}$ of first working surface 16 = diameter $d_{17}$ of second working surface 17 | 0 |
| Diameter $D_{B1}$ of first outer ring raceway 10c > diameter $D_{B2}$ of second outer ring raceway 10b | −(70/60 − 1)/0.1 = −1.7 |
| Total | −1.7 |

In this case, for example, if any one of the properties (grain size, grade and structure) of the first grinding wheel 14 is offset by 1 or 2 steps to the side of occurrence of clogging (if +1.0 to +2.0 point is added), it is possible to allow the total point to fall within the range of −1.0 to +1.0. For example, when any one of the properties (grain size, grade and structure) of the first grinding wheel 14 is offset by 2 steps to the side of occurrence of clogging, if the properties of the second grinding wheel 15 are 100K8, it suffices if the properties of the first grinding wheel 15 are set to 100M8, 100L9, 100K6, or the like (i.e., can be made to fall within the aforementioned range).

Example 2

This application is based on Japanese Patent Application filed on Apr. 25, 2006 (Japanese Patent Application No. 2006-120608) and Japanese Patent Application filed on Mar. 30, 2006 (Japanese Patent Application No. 2007-91589); the contents of which are incorporated herein by reference.

INDUSTRIAL APPLICABILITY

The manufacturing method of an outer ring for a bearing unit of the present invention can be used for manufacturing outer rings which make up various types of bearing units, such as a wheel-supporting bearing unit which is used for rotatably supporting an automotive wheel to a suspension device.

The invention claimed is:

1. A manufacturing method of an outer ring for a double-row bearing unit, comprising
    preparing the annular outer ring comprising first and second raceways formed on an inner circumference thereof, a diameter of the first raceway being larger than a diameter of the second raceway;
    preparing a grinding tool comprising a first grinding wheel and a second grinding wheel, wherein the first grinding wheel comprises a first working surface having a shape corresponding to the first raceway, and the second grinding wheel comprises a second working surface having a shape corresponding to the second raceway;
    moving the grinding tool inside the annular outer ring from the first raceway side; and
    grinding the first and second raceways simultaneously by contacting the first and second surfaces of the grinding tool with the first and second raceways, respectively, wherein
    a property of the first grinding wheel and a property of the second grinding wheel differ from each other in at least one of a grain size, a grade and a grain structure such that a tendency of one of shedding and clogging of the first working surface and a tendency of one of shedding and clogging of the second working surface are substantially equal to each other.

2. The manufacturing method of the outer ring for a double-row bearing unit according to claim 1, wherein
    a diameter of the first working surface is greater than a diameter of the second working surface,
    a difference in diameter between the first and second working surface is substantially equal to a difference in diameter between the first and second raceways and
    grinding the first and second raceways while setting a central axis of the grinding tool parallel to a central axis of the outer ring,
    wherein the property of the first grinding wheel is selected to have a greater tendency of shedding than the property of the second grinding wheel to compensate for an increased tendency of clogging of the first working surface due to the diameter of the first working surface being greater than the diameter of the second working surface such that the tendency of one of shedding and clogging of the first working surface and the tendency of one of shedding and clogging of the second working surface are substantially equal to each other.

3. The manufacturing method of the outer ring for the bearing unit according to claim 1, wherein
    a diameter of the first working surface is substantially equal to a diameter of the second working surface and
    grinding the first and second raceways while inclining a central axis of the grinding tool relative to a central axis of the outer ring,
    wherein the property of the first grinding wheel is selected to have a greater tendency of clogging than the property of the second grinding wheel to compensate for an increased tendency of shedding of the first working surface due to the central axis of the grinding tool being inclined relative to the central axis of the outer ring such that the tendency of one of shedding and clogging of the first working surface and the tendency of one of shedding and clogging of the second working surface are substantially equal to each other.

4. The manufacturing method of the outer ring for the bearing unit according to claim 1, wherein the property of the first grinding wheel and the property of the second grinding wheel differ from each other in at least one of the grade and the grain structure such that the tendency of one of shedding and clogging of the first working surface and the tendency of one of shedding and clogging of the second working surface are substantially equal to each other, wherein the grade is a strength of bonding of abrasive grains of each of the first and second grinding wheels, and wherein the grain structure is a ratio of a volume of the abrasive grains to an apparent volume of each of the first and second grinding wheels.

* * * * *